(No Model.) 2 Sheets—Sheet 1.
T. HARRIS.
APPARATUS FOR FORMING HORSE COLLARS.
No. 313,420. Patented Mar. 3, 1885.
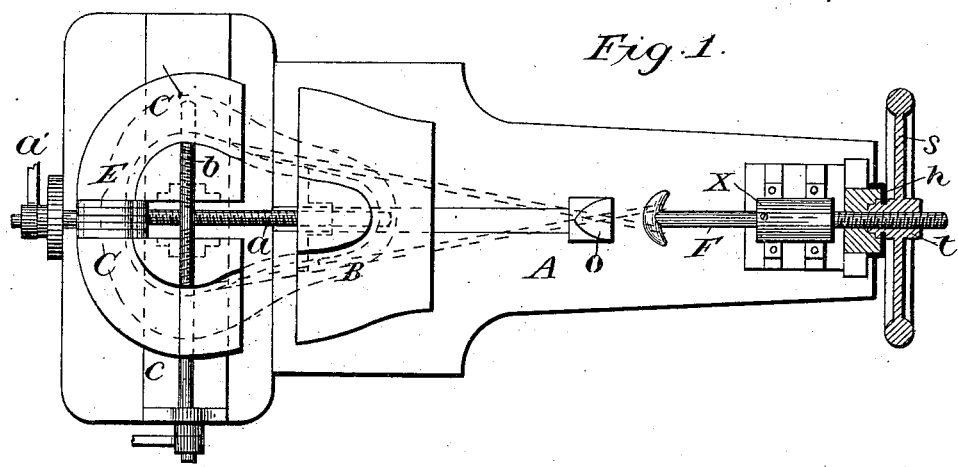
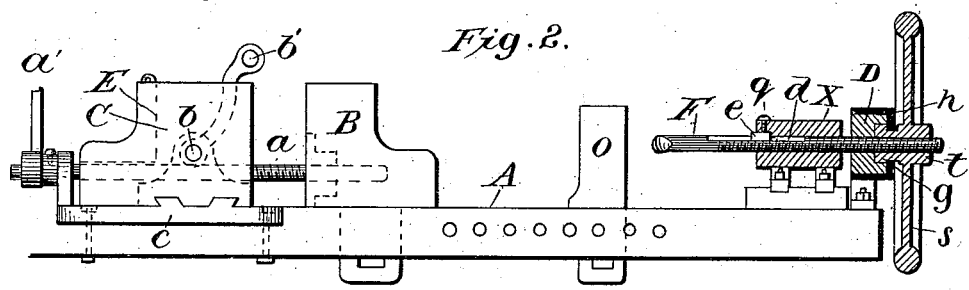
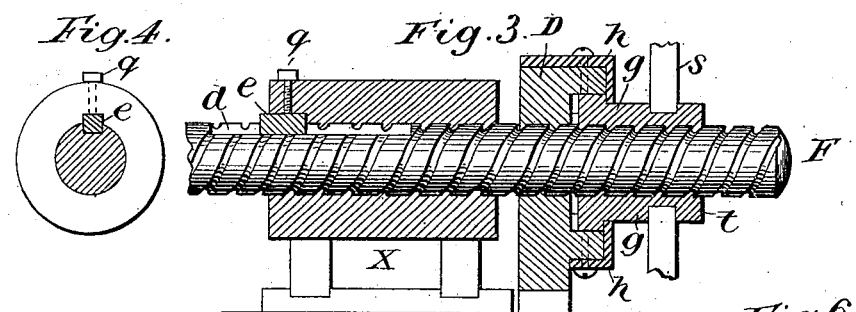
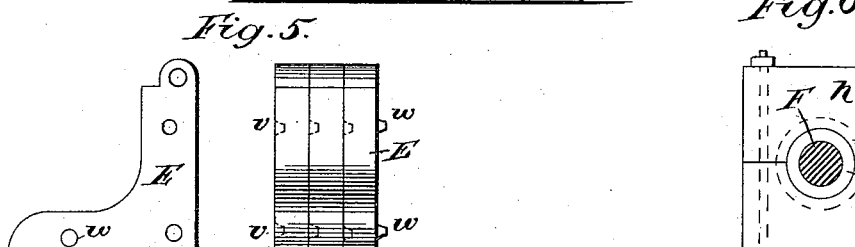
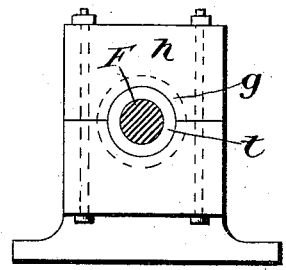
Witnesses:
Geo. L. Hazelton
J. W. McEvoy
Inventor:
Thomas Harris
By H. F. Page
Atty (No Model.) 2 Sheets—Sheet 2.

T. HARRIS.
APPARATUS FOR FORMING HORSE COLLARS.

No. 313,420. Patented Mar. 3, 1885.

Witnesses:
Geo. C. Hazelton
J. W. McCoy

Inventor:
Thomas Harris,
by H. F. Page,
atty.

UNITED STATES PATENT OFFICE.

THOMAS HARRIS, OF SACRAMENTO, CALIFORNIA, ASSIGNOR TO A. A. VAN VOORHIES, OF SAME PLACE.

APPARATUS FOR FORMING HORSE-COLLARS.

SPECIFICATION forming part of Letters Patent No. 313,420, dated March 3, 1885.

Application filed July 2, 1884. (No model.)

*To all whom it may concern:*

Be it known that I, THOMAS HARRIS, a subject of the Queen of Great Britain, residing in the city and county of Sacramento, State of California, have invented new and useful Improvements in Horse-Collar-Making Apparatus, adapted to both long and short straw collars, of which the following is a specification.

My invention relates to improvements in collar-shaping blocks and collar-roping machines and combinations of the same; and the objects of my improvements are, first, to employ means for shaping any sized collar to the same block, and, secondly, to secure a more even and better quality of horse-collars.

It is common in making collars to stuff them with either short straw, meaning thereby straw that has been run through a machine and cut into lengths of about one-fourth to one-half inch, or long straw, meaning thereby straw that is cut into lengths of from eight to twelve inches. These objects are attained by the mechanism illustrated in the accompanying drawings, in which the same letters of reference denote the same or corresponding parts in all the figures.

Figure 7:
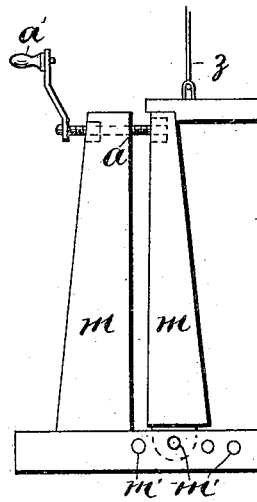
Figure 8:
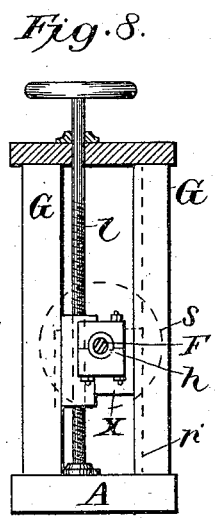
Figure 9:
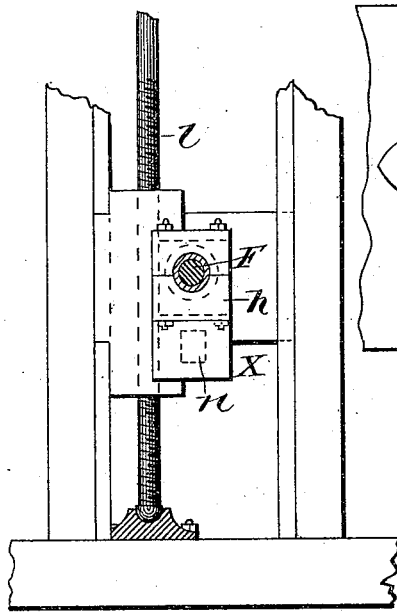
Figure 10:
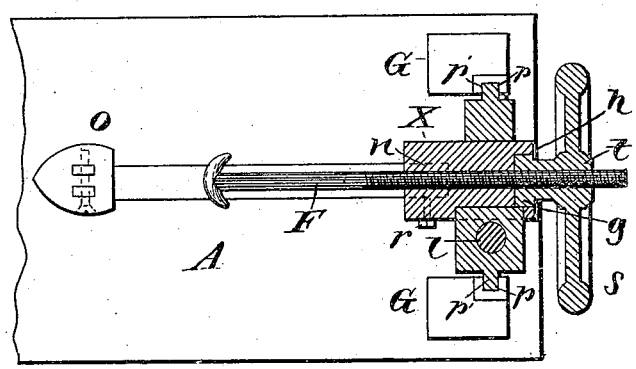

Figure 1 is a plan view of my invention, partly in section. Fig. 2 is a side elevation, partly in section. Fig. 3 is a longitudinal vertical sectional view of the right-hand end of the machine. Figs. 4 and 6 are vertical cross-sections of Figs. 1 and 2. Fig. 5 is a detail view. Fig. 7 is a side elevation, partly in section, of my invention as applied to a long-straw collar-block. Figs. 8 and 9 are vertical cross-sections of Fig. 7. Fig. 10 is a view of the right-hand end of same, partly in horizontal section.

A denotes the bench or frame; B C C', the three jaws or pieces forming the extensible collar-block. The jaw B moves in a slot in the bench, and is actuated by a screw, $a$, operated by a crank, $a'$, or any equivalent means, thus elongating and shortening the block at will. Screw $a$ is supported in a lug projecting upward from bench A or track $c$, attached to said bench. The jaws or pieces C C' move on a dovetail, $c$, or other suitable track, secured, by means of bolts or otherwise, to or made integral with the bench, and these jaws are adjustable to and from each other by means of a screw, $b$, which screw, being threaded right and left from its center, separates the blocks or brings them together, accordingly as the crank is turned one or the other way, thus expanding or contracting the block as to its width, thus forming an extensible block in all directions, and thereby adapting it to shape collars of all desirable sizes. The crevice or opening formed between jaws C C' by such extension at any stage is filled in with plates E E, preferably of cast metals, (see Fig. 5,) shaped on top—that is, on the upper and outer faces—to conform with the curves of the blocks or jaws. These plates E E are slipped in either from the top or from the rear or inner side, as they do not interfere with any of the screws, which they do not reach down to, as shown in dotted lines in Fig. 2. One or several of these plates may be inserted as required by the varying sizes of collars. The plates have lugs $w$ on one side and corresponding dents, $v$, on the other, to prevent them from slipping out.

On the right-hand end of the bed-plate or bench A is mounted, first, the roping apparatus, which comprises a rope-divider, $o$, which may be adjusted at different points on the bench in the slot, as shown in Fig. 1. The rope-divider is made leveled or rounded on the face next the collar-blocks. Also, second, the screw-hook F. This screw-hook is carried by supports X and D, which are secured by bolts or otherwise to the bench A. The screw is operated by the drive-wheel S, whose hub $t$ is provided with a female screw fitting upon and so moving in or out the screw-hook F. The hub $t$ of the drive-wheel has a recess or groove turned around it, into which recess fit the grip-plates $h\ h$, made, preferably, of metal. These plates, by fitting against the shoulder of the head $g$, made by the recess, effectually prevent the drive-wheel from dropping down out of place, even if turned entirely off the screw, the plates being secured to the supporting-block D.

In order that the screw F may not turn as it advances or recedes, (which turning would twist up the rope, as hereinafter will appear,) there is cut in the screw a slot, $d$, into which a spline or lug, $e$, set into the slide-block X, projects. There is a bolt, $q$, which secures the spline in its recess in X; or the spline may be a rigid part of slide-block X; hence, when drive-wheel S is rotated in one or the other direction, screw F will simply advance or recede without rotating.

In Fig. 7 there are seen the two jaws or pieces $m\ m$, one rigid with the bed, the other pivoted at one of the places $m'$, as a larger or smaller collar may be operated on. Screw $a$ is for the purpose of extending or contracting the length of the block. Two standards, G G, arise from the bed-plate for the attachment of the roping apparatus—namely, of the rope-divider $o$, screw-hook F, &c. As there are no plates E E used in block $m\ m$, but its greater or less width is depended on for different-sized collars, accordingly as they are fitted to it near its top or bottom, it is necessary that the roping apparatus should be adjustable up and down in standards G, in order to be always opposite the collar to be roped. To this end the standards G are provided with grooves or rabbets $p\ p$, into which corresponding tongues or projections, $p'\ p'$, on slide-block X fit. Of course, the rabbets could be in block X and the tongues on the standards, or any sufficient means for guiding the block vertically between the standards G could be adopted without departing from the spirit of my invention.

To adjust block X up and down, respectively, a screw, $l$, is provided. This screw has its lower end freely turning in the base-plate A, or in a block attached thereto, and its upper part passing through a brace which secures the tops of the standards. To this same brace is hinged a brace, U, a shoulder in the other end of which rests against the inner block, $m$, and prevents its being pulled over. When a collar is to be put on the blocks, the brace U is lifted, in which position it is held as long as desired by a weight (not shown) attached to the rope $z$, passing over a pulley. (Not shown.) In this case the rope-divider must be adjusted up or down, as may be required, to be in line with the collar and hook F, and hence, preferably, it is secured into a recess, $n$, by a screw or bolt, $r$, in the slide-block X.

Any other suitable means for elevating or depressing the roping apparatus would answer; but the screw is simple and quick to operate.

The rope-divider is made of hard wood, and may be mortised into the bench, or it may be slipped over an iron form, as indicated in dotted lines in Fig. 7. The hook end of screw-hook F might be swiveled and serve the same purpose as spline $e$ and slot $d$. The function of the rope-divider is to divide or keep separate the rope in front of the hook, thereby causing the rope to sink into and shape the top of the collar. Were the rope to go straight to the collar without being crossed and held separated by the rope-divider, there would be a part of the top of the collar (about equal to the width of the hook) that the rope would not touch; but by crossing the rope and forcing the cross near the top of the collar by the divider $o$, all the hame room possible is made in the collar.

The material of which my apparatus is made is not essential. The jaws and plates may be metal or hard wood. The drive-wheel is preferably a cast-metal wheel about two feet in diameter, more or less.

The operation is as follows: The collar, having been cut and sewed, is fastened to a stout inclined frame, and the rim is stuffed while perfectly straight with the short straw. It is then shaped with a mallet or by hand into the form of a horseshoe, and the body part is stuffed by aid of a funnel and a properly-shaped stick with the short-cut straw. The collar is then strapped and put on the block, Fig. 1, and the rope is then applied to the collar between the rim and the body, and a noose at each end of the rope is passed over the hooks or flukes of screw-hook F. The collar is forced into shape by means of screws $a$ and $b$, and as many of plates E as may be necessary are inserted, while at the same time the drive-wheel S is turned upon screw F, tightly pressing the rope into the collar between its rim and body, thus forming the V-shaped space for the hame of the harness.

Every teamster knows what trouble there is to prevent hames from slipping off new collars by reason of the collars not being well shaped when made, they usually having to acquire the shape of the hame by use; but a collar formed on my improved block gives none of this trouble, the hame perfectly fitting it from the beginning.

There are besides the collars above described what are known as "long-straw collars." The rims of these collars are stuffed with long straw, and after they are thus stuffed they are applied to the block shown in Figs. 7, 8, 9, and 10 and roped, substantially as described above. This block is simply for the shaping of the rim of the collar, while the body is shaped upon the block shown in Fig. 1 after the rim has been shaped.

Having thus described my invention, what I claim, and desire to secure by Letters Patent of the United States, is—

1. In horse-collar-making apparatus, the combination of the three adjustable jaws or blocks and the two adjusting-screws, whereby the block may be adjusted to various-sized collars, as described.

2. In horse-collar-making apparatus, the combination of the three adjustable jaws or blocks and one or more additional plates, as described, and for the purpose specified.

3. In horse-collar-making apparatus, the combination of an expansible collar-block, an adjustable rope-divider, a roping apparatus, and means, independent of the roping apparatus, for securing the said divider in its adjustments, substantially as described, and for the purposes specified.

4. In horse-collar-making apparatus, the combination of a drive-wheel having a hub provided with a groove, grip-plates, as h, adapted to fit into said groove, a bearing, as D, to which said plates are secured, and a screw-hook, F, as described, and for the purposes specified.

5. In horse-collar-making apparatus, the combination of a drive-wheel secured to the bearing, as described, the screw-hook provided with a slot, and the slide-block provided with a spline to fit said slot, whereby said hook is permitted to advance and recede without rotating, as described, and for the purpose specified.

6. The combination of the jaws or blocks B C C', their operating-screws, the bed-plate provided with track c, and slot for jaw B, the adjustable rope-divider, and the roping apparatus, as described.

7. In horse-collar-making apparatus, the combination of the jaws B C C', their several adjusting-screws, the additional plates E E, the bed-plate provided with suitable track and slot for the several jaws, and the roping apparatus consisting of screw-hook, made as described, the bearings therefor, and the drive-wheel, all as described, and for the purpose set forth.

8. In horse-collar machines, the combination of a drive-wheel provided with a hub having a groove, a grip-plate adapted to fit into said groove, a bearing to which said plates are secured, a screw-hook provided with a slot, and the slide-block provided with a spline to fit into said slot, substantially as described, and for the purposes specified.

9. In horse-collar-making machines, the combination of the collar-blocks, means for adjusting the same to and from each other, the roping apparatus, rope-divider, and means, substantially as described, for vertically adjusting the said rope-divider and roping apparatus, as and for the purposes specified.

THOMAS HARRIS.

Witnesses:
M. R. BEARD,
JAS. SEADLER.